United States Patent
Sturm et al.

(10) Patent No.: US 10,459,863 B2
(45) Date of Patent: Oct. 29, 2019

(54) TRANSCEIVER CIRCUIT FOR A CONTROLLER AREA NETWORK WITH IMPROVED SAFETY

(71) Applicant: Melexis Technologies NV, Tessenderlo (BE)

(72) Inventors: Joergen Sturm, Weimar (DE); Thomas Freitag, Plaue (DE); Michael Frey, Erfurt (DE)

(73) Assignee: Melexis Technologies NV, Tessenderlo (BE)

( * ) Notice: Subject to any disclaimer, the term of this patent is extended or adjusted under 35 U.S.C. 154(b) by 0 days.

(21) Appl. No.: 15/814,645

(22) Filed: Nov. 16, 2017

(65) Prior Publication Data

US 2018/0137071 A1    May 17, 2018

(30) Foreign Application Priority Data

Nov. 16, 2016  (EP) .................................. 16199141

(51) Int. Cl.
| | |
|---|---|
| *G06F 13/374* | (2006.01) |
| *B60R 16/03* | (2006.01) |
| *H04L 12/40* | (2006.01) |
| *G05B 19/042* | (2006.01) |

(52) U.S. Cl.
CPC ........ *G06F 13/374* (2013.01); *B60R 16/0315* (2013.01); *H04L 12/40169* (2013.01); *G05B 19/0423* (2013.01); *G05B 2219/25032* (2013.01); *H04L 12/40006* (2013.01); *H04L 2012/4026* (2013.01); *H04L 2012/40215* (2013.01); *H04L 2012/40273* (2013.01)

(58) Field of Classification Search
CPC ................... G06F 13/374; G05B 2219/25032
See application file for complete search history.

(56) References Cited

U.S. PATENT DOCUMENTS

| | | | |
|---|---|---|---|
| 6,115,831 A | 9/2000 | Hanf et al. | |
| 7,017,072 B1 | 3/2006 | Barrenscheen et al. | |
| 2004/0153870 A1 | 8/2004 | Konz et al. | |
| 2009/0021871 A1* | 1/2009 | Moran | B60K 6/28 361/15 |
| 2015/0095711 A1* | 4/2015 | Elend | G06F 11/221 714/39 |
| 2015/0312052 A1 | 10/2015 | Horst et al. | |

OTHER PUBLICATIONS

European Search Report from EP Application No. EP 16199141, dated Jan. 18, 2017.

\* cited by examiner

*Primary Examiner* — Zachary K Huson
(74) *Attorney, Agent, or Firm* — Workman Nydegger

(57) ABSTRACT

A transceiver circuit for communicating data over a CAN bus having a first and second bus line the transceiver circuit comprising: a data input port, a data output port, a CAN-bus transceiver unit having a receive data output port for providing data received from the CAN-bus, and a transmit data input port for receiving data to be transmitted to the CAN-bus; a control input port for receiving a control signal indicative of whether transmission of data from this transceiver circuit to the CAN-bus is allowed or prohibited; a filtering circuit adapted for filtering the control signal received on the control input port and for providing a filtered control signal; a logic circuitry adapted for configuring the CAN-bus transceiver unit in receive mode based on the debounced control signal irrespective of ongoing communication on the CAN-bus.

11 Claims, 6 Drawing Sheets

TRANSCEIVER CIRCUIT FOR A CONTROLLER AREA NETWORK WITH IMPROVED SAFETY

FIELD OF THE INVENTION

The present invention relates generally to systems and devices for reliably communicating over a network bus, and in particular to reliable communication over a Controller Area Network (CAN) bus in automotive applications.

BACKGROUND OF THE INVENTION

A Controller Area Network (also known as "CAN bus") is a vehicle bus standard designed to allow microcontrollers and devices to communicate with each other in applications without a host computer. CAN is a multi-master serial bus standard for connecting Electronic Control Units "ECUs" (also known as "control nodes"). Two or more nodes are required on the CAN network to communicate. All nodes are connected to each other through a two wire bus. The modern automobile may have as many as 70 electronic control units (ECU) for various subsystems, such as for example: the engine control unit, transmission control, airbags, antilock braking/ABS, cruise control, electric power steering, audio systems, power windows, doors, mirror adjustment, battery and recharging systems for hybrid/electric cars, etc.

A potential problem of the CAN bus system is that malfunction of a single device may disturb communication between all devices, or may make communication impossible. Unreliable bus communication is relatively harmless for functions such as mirror adjustment, but is of course totally unacceptable for critical functions such as engine control or safety functions.

This problem is addressed in the prior art in several ways, by making the CAN-bus physically tolerant to certain faults and/or by detecting other (e.g. logical) fault conditions. For example, communication is still possible if one of the CAN bus lines (CANL or CANH) is accidentally connected to ground or to the supply voltage. This fault condition can be detected by monitoring voltage levels, but even during the fault condition, communication can continue. Another example is the use of standardised messages and by fault detection circuitry monitoring the syntax of those messages, and if the protocol is violated, to take appropriate measures.

For example, U.S. Pat. No. 7,017,072(B1) describes a system, where a CAN bus is partitioned in two network sections, which can be physically separated by means of a protective circuit comprising two fault state detection circuits for detecting a fault in each of the sections.

SUMMARY OF THE INVENTION

It is an object of the present invention to provide a transceiver circuit for improving reliability of communication over a CAN-bus. The present invention also provides a device comprising such transceiver circuit, and a system comprising such device.

It is a particular object of embodiments of the present invention to provide a transceiver circuit, a system, and a device for prohibiting a faulty control node to jam the CAN bus by sending too much traffic on the bus, or by sending (content wise) incorrect data to the bus, however in syntactically correct messages, so that these messages cannot be detected by classical fault state detection circuits that monitor whether the messages sent on the CAN-bus satisfy the CAN-bus communication protocol.

It is a particular object of embodiments of the present invention to increase behaviour safety according to the use cases described in ISO26262.

It is an object of particular embodiments of the present invention to provide a control node having at least two subcircuits, a first subcircuit for generating data to be transmitted over the CAN-bus and a second subcircuit (in the same package) for monitoring and/or verifying the generated data, where the second subcircuit is adapted for preventing that the first circuit jams the CAN-bus.

It is an object of particular embodiments of the present invention to provide a system having at least two control nodes, a first control node for generating data to be transmitted over the CAN-bus and a second control node (in a different package) for monitoring and/or verifying the data generated by the first control node, where the second control node is capable of preventing the first control node to jam the CAN-bus.

These and other objectives are accomplished by embodiments of the present invention.

In a first aspect, the present invention provides a transceiver circuit for communicating data over a CAN bus, the CAN-bus having at least a first and a second bus line, the circuit comprising: a data input port for receiving a signal to be transmitted over the CAN-bus; a data output port for providing a signal received from the CAN-bus; a CAN-bus transceiver unit having a receive data output port for providing data received from the CAN-bus, and a transmit data input port for receiving data to be transmitted to the CAN-bus; a control input port adapted for receiving a control signal indicative of whether transmission of data from this transceiver circuit to the CAN-bus is allowed or prohibited; a filter circuit adapted for filtering the control signal received on the control input port and for providing a filtered control signal; logic circuitry adapted for configuring the CAN-bus transceiver unit in receive mode based on the filtered control signal, asynchronous with respect to communication on the CAN-bus, thereby preventing the circuit from transmitting data to the CAN-bus.

It is noted, that the proposed solution is not based on monitoring the bus data protocol queries or message syntax, and is not based on monitoring the physical voltage levels, but provides a means to switch the transceiver from transmit mode to receive mode, moreover in an asynchronous manner.

It is noted, that "configuring in receive mode" is not the same as "disconnecting" from the bus, because the transceiver unit of the present invention will still be able to receive data from the CAN-bus.

In other words, where a prior art transceiver circuit or module is configured to transmit or to receive dependent on the network bus traffic, the transceiver of the present invention can be forced into receive mode irrespective of the presence of data to be transmitted, and asynchronous to the traffic on the CAN-bus, depending on a transmit-enable signal or transmit-disable signal to be provided by a monitoring unit. This control signal may be a voltage present on a pin of a semiconductor device, or may be an internal voltage node.

It is an advantage that the proposed solution concentrates on an asynchronous implementation of the hardware access towards the transmitter that is connected to the CAN bus, rather than finding a solution at system level. This solution is conceptually much easier to understand, and can work much faster.

The control signal can be defined as a transmit-enable signal or a transmit-disable signal, and may be defined as an active low or an active high signal. The predefined voltage range can be chosen accordingly, in manners known per se in the art.

The proposed solution offers double safety by two independent deactivation paths: the CAN network itself, as well as the "control signal" described above, which can switch the CAN transceiver from transmitting into receiving mode. By doing so, the transmitting part is set into the recessive state not overruling bus traffic, but the transceiver is not removed from the network, and the transceiver is still provided with power for allowing reception of data from the CAN-bus.

It is an advantage of this transceiver circuit that the control input port or pin can be used to add a second level safety approach.

The filter circuit is adapted for reducing the risk of maltriggering due to signal disturbances, such as by ringing or spikes, and can be implemented for example as a passive RC filter, or as a digital filter, e.g. a debouncing filter.

In an embodiment, the filter circuit is a debouncing circuit.

The debouncing circuit may have a predefined debouncing time, or the bouncing time may be configurable, e.g. selectable from a limited set of predetermined values, but only during production. In the final product, the debouncing time, or time window, is fixed, and cannot be set or changed by software, which is beneficial for safety applications.

In an embodiment, the logic circuitry is adapted for configuring the CAN-bus transceiver unit in receive mode solely based on the filtered control signal and/or on a signal present on the data input port.

In an embodiment, the output of the logic circuitry is directly connected to the transmit data input port of the CAN-bus transceiver unit.

Preferably the "last" component of the logic circuitry, e.g. the logic gate which is actually connected to the transmit data input port TX of the actual transceiver, is a two-input AND-gate or a three-input AND gate or a two-input NAND gate or a three-input NAND-gate.

In an embodiment, the logic circuitry does not contain an isolated switch.

In an embodiment, the logic circuitry consists only of combinatorial gates.

In an embodiment, the logic circuitry is adapted for operating asynchronously in respect to traffic over the CAN network.

In the example of FIG. 3, the logic circuitry can consist of only two logical gates: a single NOT gate and a single NAND-gate, but of course, the present invention is not limited thereto, and other combinatorial circuits may be used as well.

While a logic circuit containing only asynchronous combinatorial gates are preferred, the invention would also work if the logic circuit would comprise synchronous logic, having for example one or more flip-flops.

In a second aspect, the present invention provides a CAN-node comprising: a transceiver circuit according to the first aspect; a controller adapted for generating data, and having an input port connected to the data output port of the transceiver circuit for receiving data from the CAN-bus, and having an output port connected to the data input port of the transceiver circuit for transmitting the generated data to the CAN-bus.

In an embodiment, the controller further comprises: an enable port connected to the control input port of the transceiver circuit for selectively allowing or prohibiting transmission of data to the CAN-bus.

The controller may be a microcontroller or a DSP or programmable logic or any other kind of controller.

In an embodiment, the controller comprises: a state machine for generating said data to be transmitted via said output port and for processing data received via said input port; and a monitoring unit for monitoring the data transmitted by the state machine, and for providing a control signal for selectively allowing or preventing the generated data to be transmitted to the CAN-bus.

In an embodiment, the CAN-node further comprises: a second controller having an enable port connected to the control input port of the transceiver circuit, the second controller being adapted for monitoring the data transmitted by the first controller, and for providing a control signal for selectively allowing or preventing the generated data to be transmitted to the CAN-bus.

The first controller may be a microcontroller or a DSP or programmable logic or any other kind of controller. The second controller is a separate controller, and can also be a microcontroller or a DSP or programmable logic or any other kind of controller.

It is an advantage of using a second controller to analyse the data transmitted by the first controller, because this enhances the chance of detecting an error.

In a third aspect, the present invention provides a CAN-bus system comprising: a CAN-bus having at least a first and a second bus line; at least one CAN-node according to the second aspect.

In an embodiment, the at least one CAN node comprises a first CAN-node being connected to the CAN-bus, and comprising said controller for generating data, and comprising the transceiver circuit with the control input port; and the CAN-bus system further comprises: a monitoring unit for monitoring the data transmitted by the first CAN node, and having an output port connected to the control input port of the first CAN-node, and adapted for monitoring the data and/or analysing the traffic transmitted by the first CAN-node, and adapted providing a control signal for selectively allowing or preventing the data generated by the controller of the first CAN-node to be transmitted to the CAN-bus.

The second device may be located on the same PCB as the first device, and may be powered by the same voltage generator. This has the advantage of requiring only one voltage generator, but is less safe because failure or malfunction or disturbance of one or more components on said PCB may affect both the first and the second device.

Alternatively, the first device may be mounted on a first PCB having a first voltage generator, and the second device may be mounted on a second PCB different from the first PCB, and may have a second power supply. This has the advantage that failure or malfunction of a component on the first PCB usually has no or only little influence on failure or malfunction of components on the second PCB, thus offers higher safety.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

DETAILED DESCRIPTION OF ILLUSTRATIVE EMBODIMENTS

Figure 1:
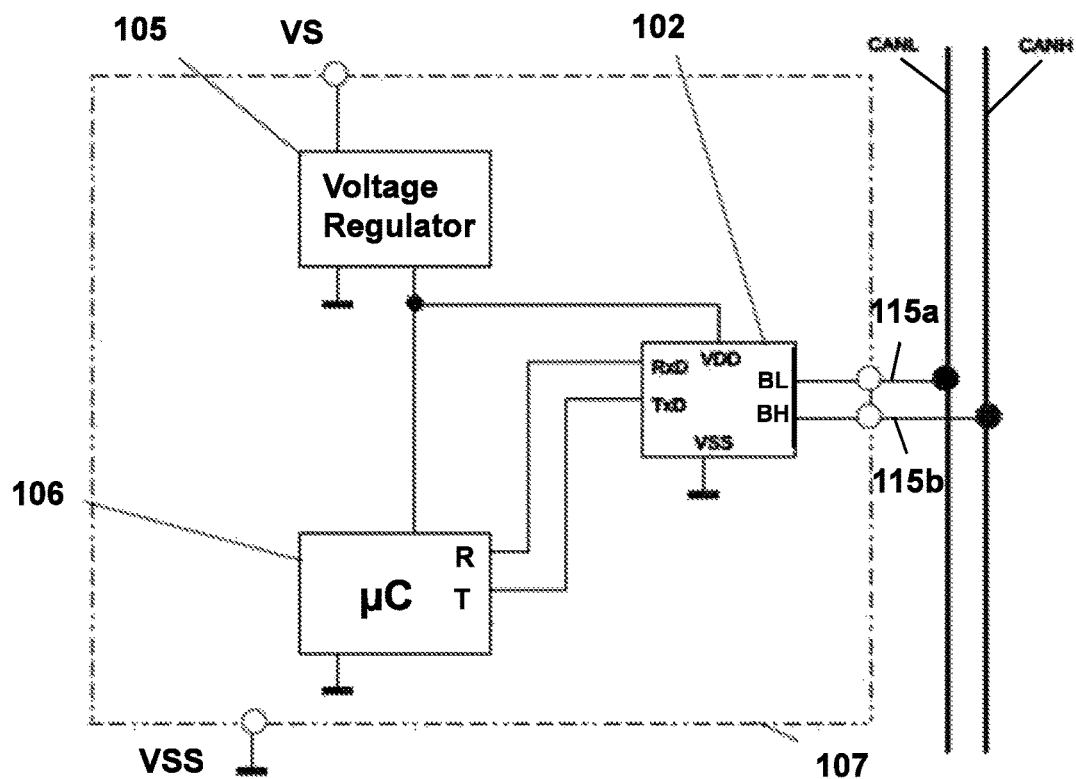
FIG. 1 shows a schematic block-diagram of an exemplary Electronic Control Unit (ECU) connected to a Controller Area Network (CAN) bus, known in the art.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in this document the term "voltage node" is used, what is meant is a region in an electrical circuit where there is no change in potential, such as for example an interconnection line or a pin of a package made of an electrically conducting material such as aluminum or copper.

Where in this document the term "control node" or "ECU" or "Electronic Control Unit" or "CAN node" is used, what is meant is a device operatively connectable to a CAN bus for sending and receiving messages.

Where in this document the term "network" is use, a "CAN-bus network" is meant.

Where in this document the term "port" is used, for example as "input port" or "output port", what is meant is "a pin" or a "terminal" or "a pad" or any other kind of "electrical voltage node", which may be an internal voltage node inside a chip package, or may be a "package pin".

The communication in a Controlled Area Network (CAN-Bus) should always be running as time critical since application critical information might be exchanged by the different control units over that network. Since in CAN-Bus applications each control unit can put signals on the CAN bus, it is of interest, that a malfunction of one control unit has no or only little influence on the communication traffic over the network.

In functional safety related applications it is important to guarantee, that the communication between the CAN nodes will not be disturbed or blocked by one (faulty) CAN node transmitting too much information on the bus. As is well known in the art, every CAN node has a transceiver comprising a receiver and a transmitter. So, the inventors were confronted with the problem of modifying the CAN node such that it no longer transmits data to the CAN-bus (when a certain fault condition has been detected).

To realize this, a two-level safety approach is desired. The CAN transmitter could be disabled via an SPI command (as is known in some prior art solutions). SPI communication is asynchronous and independent in its behaviour compared to the ongoing network traffic via the CAN bus, hence can be used as a second level safety concept. However, an SPI communication requires a communication, which takes time, and requires complex hardware.

Desiring to provide a faster solution, for example a solution that allows to stop the faulty node from transmitting on the CAN-bus within 500 μs (microseconds) after detection of the fault condition or even faster, the inventors came to the idea of providing a direct hardware access. The present invention describes how a malfunctioning control unit can be prevented from transmitting information to the network in a very fast (e.g. within 500 μs or even within 100 μs) and asynchronous way (asynchronous to ongoing CAN traffic), without physically removing the CAN node from the bus. Thus the (faulty or deemed faulty) control unit can still receive data, but cannot transmit data to the CAN bus, and thus cannot jam the CAN-bus.

FIG. 1 shows a schematic block-diagram of an exemplary Electronic Control Unit (ECU) 107 connected to a Controller Area Network (CAN) bus, known in the art. The ECU, also referred to herein as "CAN node" or "control node", comprises a CAN-transceiver unit 102 comprising a transmitter and receiver (not explicitly shown) and a voltage regulator 105 for providing a predefined voltage VDD, and a microcontroller 106 for processing received data and/or for transmitting data. Such Control Units and the functional blocks and their operation are well known in the art, and hence do not need be explained in further detail. The ECU may be implemented as a semiconductor circuit packaged in a chip package, as is known in the art. The chip may be powered via a voltage supply VS and VSS (sometimes also referred to as "ground" or "earth"). As can be seen, the control node 107 is connected to the CAN-bus via two connection lines 115a, 115b.

In practice, the control node 107 would typically have further blocks (not shown) depending on the specific function of the specific control node, for example, the control node may have an embedded sensor (not shown in FIG. 1), and the microcontroller 106 would typically be programmed for performing a specific function, for example for reading out the sensor and for providing the sensor data to another device connected to the CAN-bus. Of course the block-diagram of FIG. 1 is only a simple example to illustrate some components or blocks relevant to describe the present invention.

Figure 2:
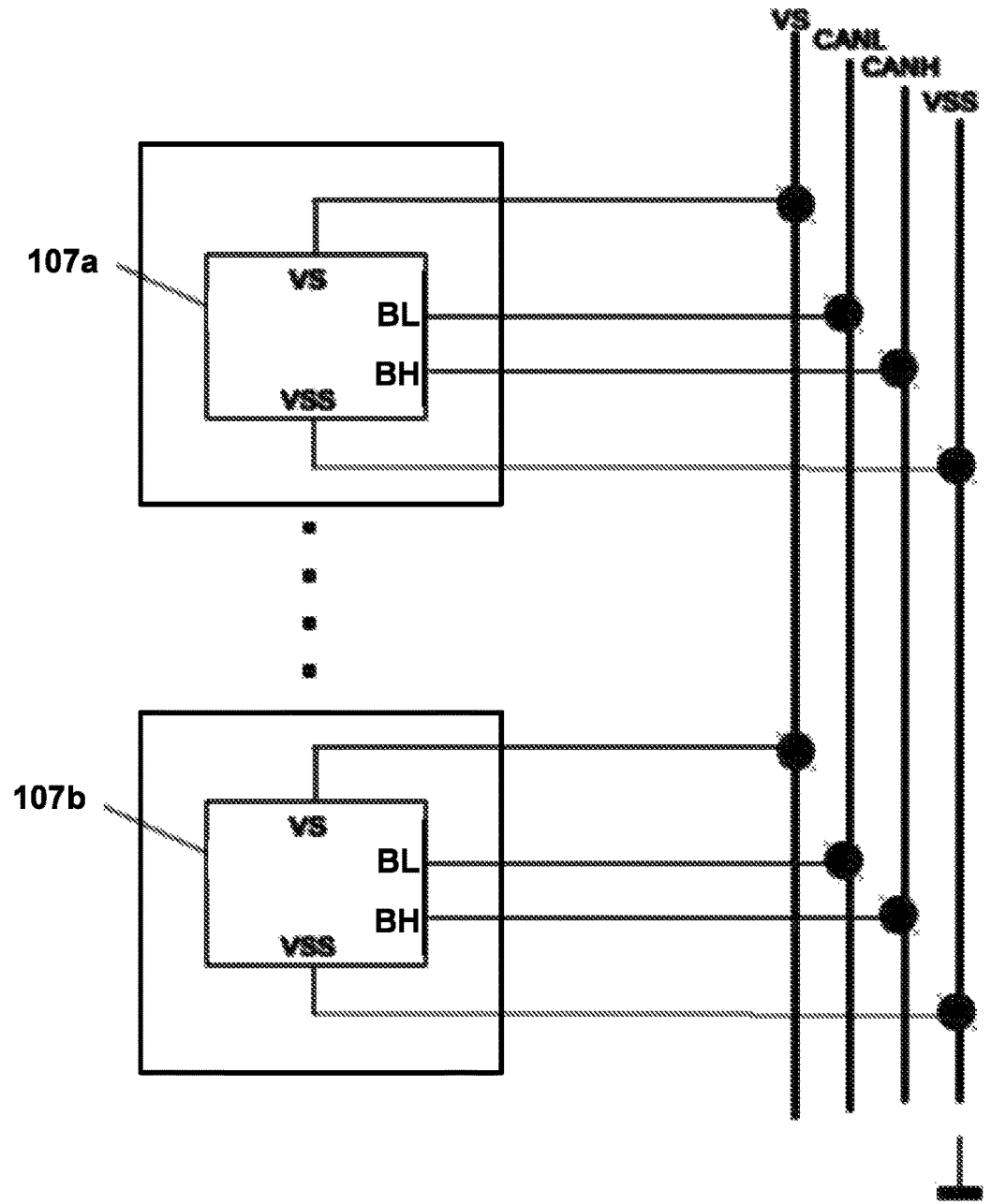
FIG. 2 is a schematic block-diagram showing a system with a CAN-bus and two CAN-nodes, known in the art.

FIG. 2 is a schematic block-diagram showing an exemplary system with a CAN-bus and a plurality of control nodes 107a, 107b similar to the control nodes shown in FIG. 1, (only two such nodes are shown in FIG. 2). This example is intended to illustrate that the two CAN-bus lines CANL, CANH, may be accompanied by a voltage supply line VS and the ground line VSS. Each of the devices 107a, 107b connected to the CAN-bus can receive data from the CAN-bus and may transmit data to the CAN-bus, but of course only one device is permitted to transmit data to the CAN-bus at any moment in time.

The present invention is concerned with the problem, that a particular control node, for example control node 107a, is transmitting too much data, for example at a data rate larger than at an intended predefined data rate, but doing so in a syntactically correct manner. Thus the fault condition is not a violation of the bus-protocol but is related to an abnormal amount of traffic sent by one particular control node, which is jamming or congesting traffic on the bus. This situation can for example occur when the microcontroller of the control node 107a would be reading its sensor (not explicitly shown) at an incorrect frequency (e.g. at least twice the intended frequency), and would be transmitting all that data (thus, in the example, creating a data rate which is at least a factor 2.0 higher than the intended data rate).

The inventors considered the following possibility: if the two control nodes 107a, 107b would both have an SPI interface, and if the second control node 107b would be programmed for detecting if device 107a is sending too much traffic to the bus (for example at a data rate which is at least a factor 2.0 higher than a predetermined value), and if the first control device 107a is programmed for receiving an SPI message related to this condition, then the node 107b could send an SPI message to node 107a to stop transmitting. However such detection and such communication is time-consuming. Moreover, this corrective action assumes that all other functions of both nodes 107a, 107b are working correctly, in particular the SPI communication, and the ability of the processor of the first control node 107a to stop transmitting data. The inventors wanted to find a solution that allows faster corrective action, and requires less hardware to be involved.

After carefully analysing the problem in the light of the block diagram shown in FIG. 1, the inventors realised that a solution wherein the transceiver unit 102 could be disabled or could be disconnected from the CAN-bus would solve the above described problem. However such solution would also prevent the control node 107 to receive messages from the CAN-bus, which is undesirable.

Instead, the inventors came to the idea of switching the transceiver unit from transmit mode into receive mode while allowing the (deemed faulty) control node to still receive messages via the CAN-bus. Or stated otherwise: the receiver is left "ON" (operational), but the transmitter is prevented from sending data to the bus. In one embodiment, the transmitter stays active but sends the non-destructive recessive state.

It is noted that the solution provided by the present invention cannot only be used in case of too high traffic generated by a particular CAN node (e.g. more traffic than a predefined threshold value), but can also be used to detect wrong operating states of a transmitting node, such as for example transmission of "garbage data" (e.g. syntactically correct, but for example using non-existing addresses), or even when the node is not sending data while data was expected, because also in this case the node seems to be defective. Other examples could be a CAN node with a defective sensor, transmitting meaningless or invalid data, for example a temperature sensor transmitting unrealistic temperature values (e.g. temperatures of +200° C. or more), but other kinds of wrong sensor information is also contemplated, like unrealistic or impossible speed information for a gear box, unrealistic or impossible position information from a magnetic or inductive angular or linear sensor, as used e.g in electronic steering.

Control information could also be invalid (content-wise), e.g. one unit sending wrong information towards some motor resulting in an error in another supervising unit. Any application using motors to control position could be addressed (from classical window lift, seat positioning, valves or flaps in the air conditioning system, valves of pump systems (water or fuel pumps) etc. Of course the more knowledge the monitoring circuit has about the data to be transmitted, the more sophisticated the fault detection can be, but the description of such detection algorithms falls outside the scope of the present invention, which is directed to the hardware for preventing the faulty CAN node from jamming the CAN-bus.

Figure 3:
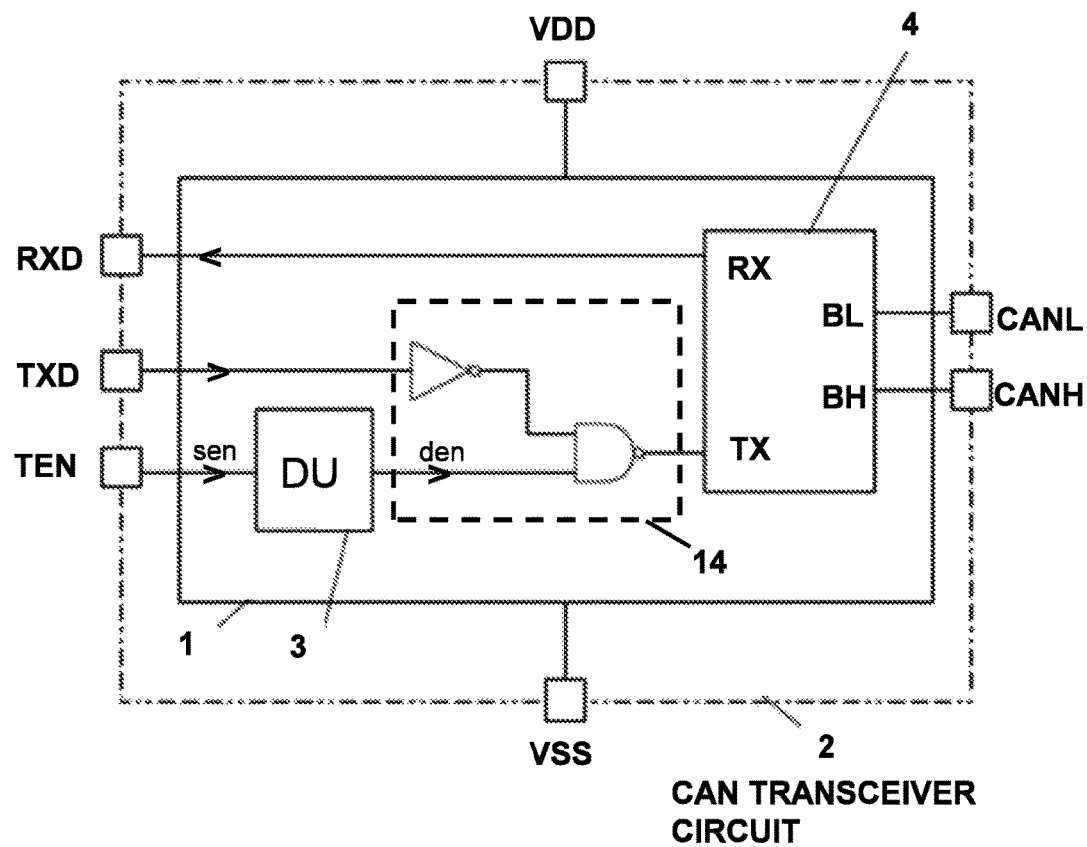
FIG. 3 shows an example of a CAN transceiver circuit according to an embodiment of the present invention.

FIG. 3 shows a transceiver circuit 2 proposed by the present invention, that solves the problem. The reader should compare this transceiver circuit 2 with the transceiver circuit 102 of FIG. 1, the main differences being that there is an additional "TEN" (which stands for Transmit ENable) terminal or pin, and an additional filter 3, and a logical circuit 14. The transceiver circuit 2 comprises:

a data input port TXD for receiving a data signal (e.g. from a microcontroller) to be transmitted to the CAN-bus;

a data output port RXD for providing a data signal received from the CAN-bus (e.g. to a microcontroller);

a CAN-bus transceiver unit 4 having a receive data output port RX for providing data received from the CAN-bus, and a transmit data input port TX for receiving data to be transmitted to the CAN-bus. It is explicitly pointed out that the transceiver unit 4 can be identical to the prior art transceiver unit 102, which is a major advantage in terms of design and verification and qualification testing;

a control input port TEN adapted for receiving a control signal indicative of whether transmission of data from this transceiver circuit 2 to the CAN-bus is allowed or prohibited. The control signal (e.g. enable-signal) can be provided by a monitoring circuit (not shown in FIG. 3);

a filter circuit adapted for filtering the control signal "sen" received on the control input port TEN and for providing a filtered control signal "den";

logic circuitry 14 adapted for configuring the CAN-bus transceiver unit 4 in receive mode based on the debounced control signal "den", irrespective of the state of the network or the ongoing communication on the CAN-bus, thereby preventing the circuit from transmitting data to the CAN-bus.

According to an underlying principle of the present invention, this is implemented in a specific manner by keeping the receiver and the transmitter active, and by "overruling" the data to be transmitted in such a way that the transmitter is forced in the non-destructive recessive state.

The filter circuit 3 can be an analog filter circuit such as a passive RC filter circuit, or can be a digital filter circuit, also known as "debouncing circuit". The purpose of the filter circuit is to avoid unwanted maltriggering of the logic circuit 14 due to fluctuations of the signal "sen", e.g. containing ringing or spikes due for example to EMC/ESD, cross-talk, etc. By adding the filter circuit or debouncing circuit, the risk of inadvertently prohibiting transmission, for example in case of EMC or ESD disturbances in the application, can be avoided, making the solution more robust.

Debouncing circuits are known in the art and hence do not need be described in full detail here. The filter circuit uses a predefined, e.g. built-in time window ΔT. The time window ΔT may be configurable in an end-of-line test (during production), but is fixed for the application. It is explicitly pointed out that this time-window is not configurable/programmable in the application, thereby avoiding malfunction of the time-window due to potential software errors. It is explicitly pointed out that the filter circuit or debouncing circuit is not implemented in software (e.g. as a subroutine running on the same microcontroller that is sending the data), but is implemented as a dedicated hardware block. Using a digital debouncing circuit offers the advantage over a simple RC circuit that it typically requires less space in an integrated semiconductor device, especially for relatively long debouncing times (e.g. larger than 0.100 ms).

In the specific example of FIG. 3 the control signal "sen" is "active high", and the logic circuitry 14 consists of an inverter (also known as a "NOT gate") and a "NAND-gate", arranged for providing a logic '0' to the TX input of the transceiver circuit 4 when the signal on the TXD input is logic '0' and the signal "sen" on the TEN control input is logic '1'. If the control signal "sen" is "low", the CAN transmitter is forced to stay in recessive state and can not put data on the CAN-bus.

But other logic circuits 14 capable of preventing signals to be transmitted while allowing the transceiver unit 4 to receive data from the CAN-bus can also be used.

In a variant of the circuit of FIG. 3 (not shown) the control signal "sen" could be an "active low"-signal rather than an active high signal, and the logic circuitry would be adjusted accordingly.

Instead of using pure combinatorial logic, it is also possible to use synchronous logic comprising one or more flip-flops.

In particular embodiments, the "digital debouncer" circuit and the "logical circuit" can be combined, and may comprise for example a counter for implementing the windowing function.

It is pointed out that the logic circuit does not contain a so called "isolated switch", in particular a switch that electrically disconnects the transceiver unit 4 from the TXD input line, but that logic gates (such as e.g. AND, NAND, OR, NOR, NOT, XOR) are used instead. This offers the advantage of providing a guaranteed output level rather than leaving the input TX of the transceiver 4 floating. Moreover, simple logic gates occupy less space when implemented in an integrated semiconductor device.

Although the present invention is mainly focused on the hardware implementation of the CAN-transceiver circuit 2 as shown in FIG. 3, and a control node comprising such a transceiver circuit, the following scenario is envisioned from a system-point of view: Assume that the control node with the CAN-transceiver circuit (further referred to as "faulty node") is part of a CAN-system comprising a plurality of control nodes. The system also comprises a control node with monitoring and/or analysing capabilities. Suppose now that the faulty node is sending too much data to the CAN-bus, or is not sending data to the CAN-bus while it should, or is sending nonsense-data. The monitoring unit is monitoring and/or analysing the data (or data traffic) sent by the faulty device, and determines that the faulty device is functioning incorrectly. The monitoring unit may be implemented (e.g. as a second microcontroller) implemented in the same device or may be implemented in another device present on the same PCB as the faulty node, or may be implemented in another device on a different PCB. In each case, the monitoring unit has an output port (or pad or pin or terminal) which is electrically connected to the TEN port (or pad or pin or terminal) of the transceiver circuit 2 of the faulty device. The monitoring unit asserts the TEN "pin" to prevent the faulty device from sending data to the CAN-bus. Subsequently, a "reset" or "soft-reset" message is sent over the CAN bus to the faulty-device, e.g. by the monitoring unit itself or by another device. Since the faulty device is still capable of receiving this "reset" or "soft-reset" message, it may be able to actually reset or soft-reset itself. Depending on the cause of the error, the faulty device may restart and operate correctly after the restart. Some time later, the monitoring unit can diagnose the faulty device, and/or may allow the faulty device to transmit data on the bus again, by sending an appropriate signal to the TEN pin for allowing such transmission. If the faulty device is behaving "correctly" (according to a set of predetermined rules, which may include sending data at a data rate in a predefined range), the monitoring unit would decide that the "faulty device" (although not faulty anymore) can stay on the CAN-bus and is allowed to receive and transmit data from and to the CAN-bus. If the faulty device is still or again malfunctioning, the monitoring device can repeat the actions described above, and/or may decide after a predefined number of retries to prevent the faulty device from sending any more data to the bus, for example until the next power-up of the system. It is noted that the other parts of the network are not or only marginally disturbed, and are still operating, even while this particular faulty node is "reset" via the CAN-bus.

In a variant of the CAN-transceiver circuit of FIG. 3, the CAN transceiver circuit has two "TEN" pins, for example a first transmit-enable/disable pin "TEN1" for allowing a first controller (e.g. microcontroller or state-machine or DSP) to prohibit transmission of data to the CAN-bus, and a second transmit-enable/disable pin "TEN2" for allowing a second controller (e.g. microcontroller or state-machine or DSP) to prohibit transmission of data to the CAN-bus. The logic circuit 14 may then combine the signals from the two transmit-enable/disable pins TEN1, TEN2, and the transmit data TXD, for example by means of a three-input AND gate, or a three-input OR-gate, or equivalent logic circuitry.

Figure 4:
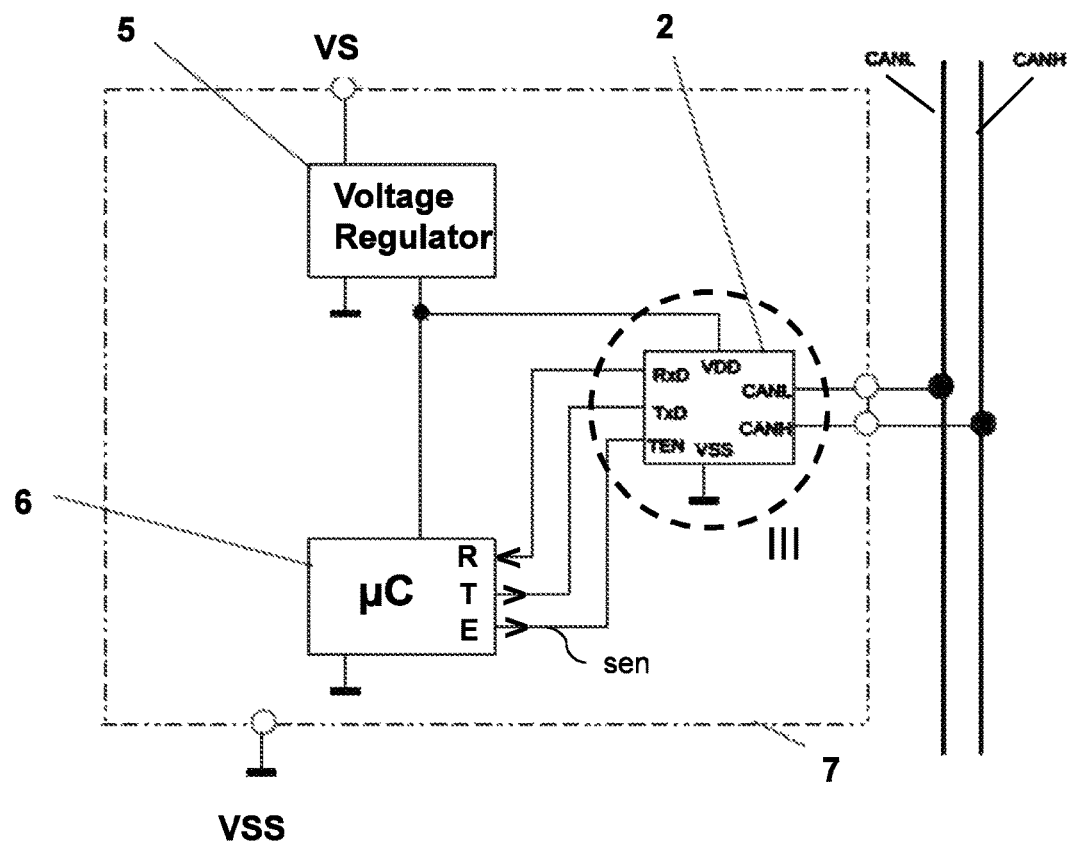
FIG. 4 shows a schematic block-diagram of a CAN-node according to an embodiment of the present invention, comprising a CAN transceiver circuit of FIG. 3.
Figure 5:
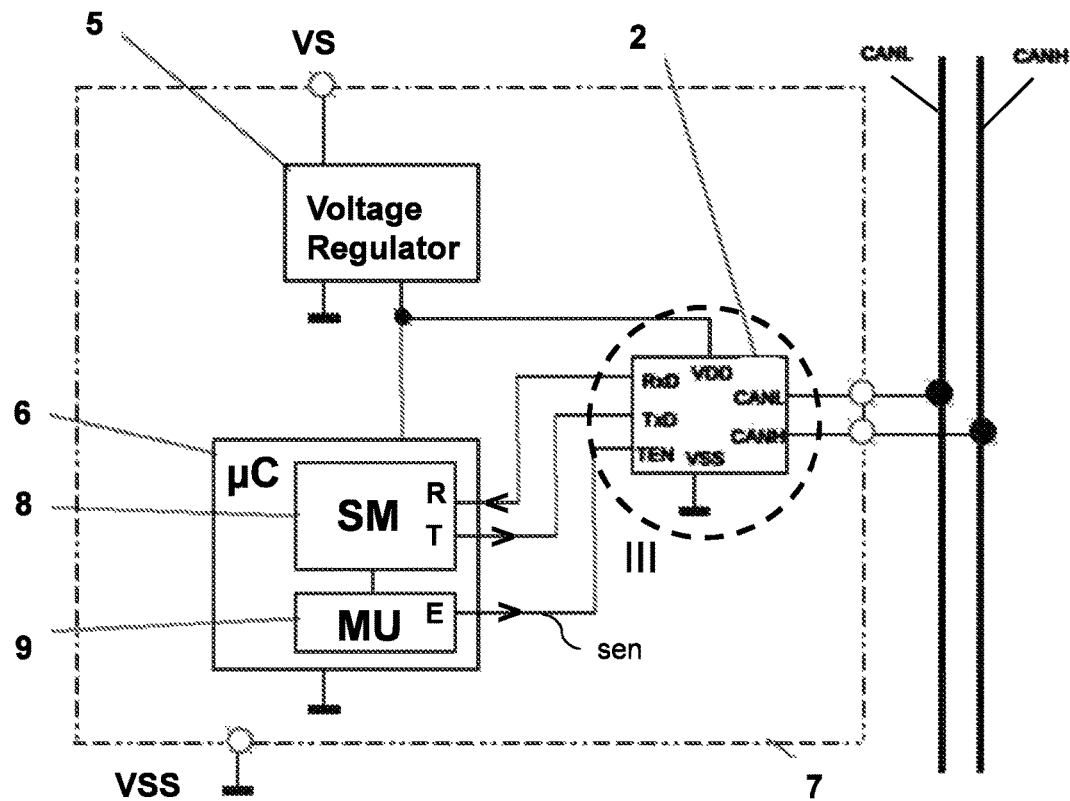
FIG. 5 shows a variant of the CAN-node of FIG. 4, as another embodiment of the present invention.
Figure 6:
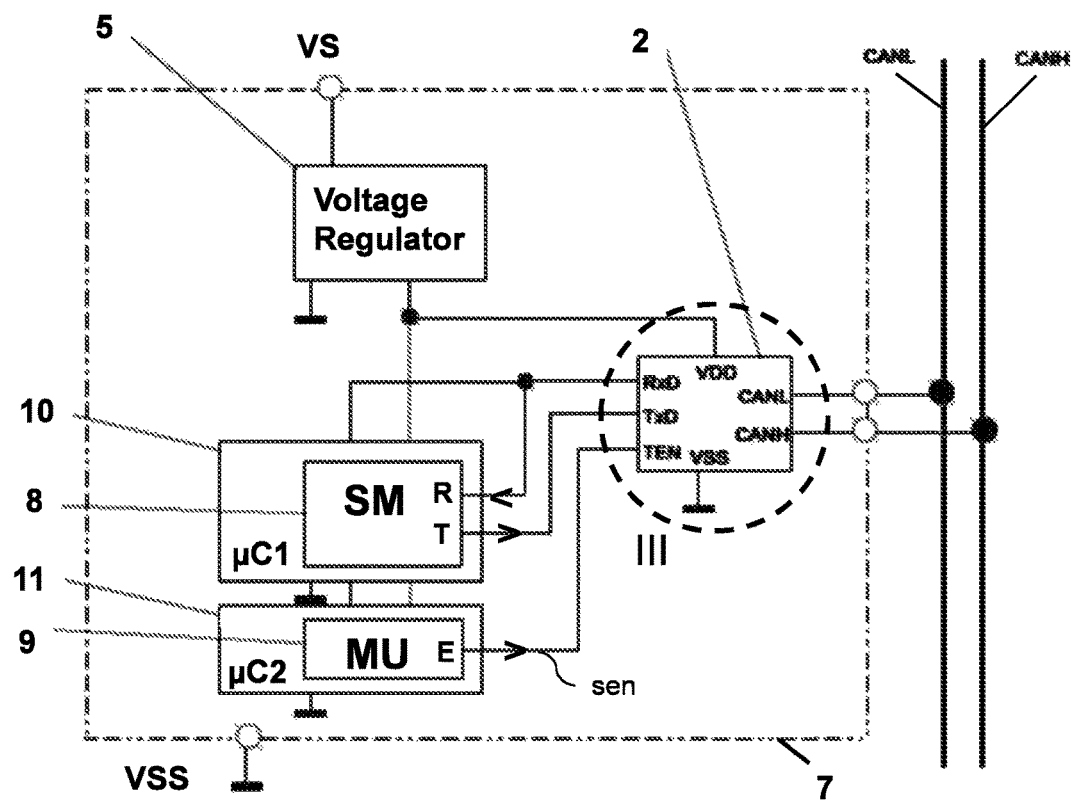
FIG. 6 shows another variant of the CAN-node of FIG. 4, as another embodiment of the present invention.

In FIG. 4, FIG. 5 and FIG. 6 three examples will be shown how the transceiver circuit 2 can be used in CAN-bus control nodes.

FIG. 4 shows a schematic block-diagram of a first example of a CAN-node according to an embodiment of the present invention. As can be seen, the CAN-node 400 comprises a transceiver circuit 2 as described above (see FIG. 3), having a data input port TXD, and a data output port RXD and a control input port TEN, connected respectively to an input port R, an output port T and an output port E of the microcontroller 6.

As can be seen in FIG. 4, in this case the microcontroller 6 itself would recognise the fault condition, and would take appropriate action by controlling the TEN input of the transceiver circuit 2 so as to prohibit transmission of data in case a fault condition is detected. In the example of FIG. 4, the microcontroller 6 would typically have one software-routine for transmitting the data, and another software-routine for monitoring and/or analysing the data. As is well known in the art, the two subroutines can be executed in parallel on two processor cores, or virtually in parallel on a single processor core by using a operating system (e.g. a multi-tasking operating system) or by time-multiplexing the different routines, or the like.

As can be seen the transceiver unit 2 is not detached from the power supply, in order to allow reception of data from the CAN-bus.

While the example of FIG. 4 is shown with a microcontroller 6, the same solution would of course also work with another processor such as for example programmable logic, a DSP, a dual core processor, or any other controller.

In the embodiment shown in FIG. 4 the box 7 represents a chip package, in which case the microcontroller 6 and the transceiver circuit 2 are embedded in a single package, hence the control signal "sen" (provided to node TEN) for preventing data-transmission is also located inside the package, but other partitioning of the functional blocks is also possible.

In the embodiment described above, the box 7 indicates a single chip package.

In another embodiment, also illustrated by FIG. 4, the box 7 indicates a PCB boundary, the microcontroller 6 is embedded in a first chip package, and the transceiver module 2 is implemented in another chip package, and the signal "sen" is routed over the PCB. There may be a single voltage regulator 5 for both chip packages (as shown), or each chip package may have its own voltage regulator (not explicitly shown).

FIG. 5 shows a variant of the CAN-node shown in FIG. 4, where the microcontroller 6 comprises a CAN controller or CAN state machine 8 adapted for processing data received from the CAN-bus and/or for transmitting data to the CAN-bus, and further comprises a monitoring unit 9 adapted for monitoring correct functioning of the state machine SM. Such monitoring may be implemented in several ways depending on the specific functionality of the control node 500. In the example shown in FIG. 5, the state machine 8 provides one or more signals to the monitoring unit 9, but in other implementations the monitoring unit 9 may analyse the actual data sent by the state machine 8 to the transceiver circuit 2.

Or stated in another way: the microcontroller 6 is handling the CAN communication by a CAN controller or a CAN state machine 8 and thus processing the information. The microcontroller 6 is also handling the TEN pin and can switch the CAN transceiver 2 from a transmit mode to a receive mode at any time. The microcontroller 6 further incorporates a supervision unit 9, for example a watchdog to supervise correct configuration and/or correct functioning of the CAN controller or CAN state machine 8. In case of a problem, for example a lock in the CAN controller or CAN state machine 8, the supervision unit 9 of the microcontroller 6 can activate the "pin" TEN to bypass the CAN communication controller or state machine 8 and to force the CAN transceiver 4 from a transmit mode to a receive mode independently, e.g. asynchronously from the CAN communication on the CAN-bus.

In the embodiment described above, the box 7 indicates a single chip package.

In another embodiment, also illustrated by FIG. 5, the box 7 indicates a PCB boundary, the microcontroller 6 is embedded in a first chip package, and the transceiver module 2 is implemented in another chip package, and the signal "sen" is routed over the PCB. There may be a single voltage regulator for both chip packages (as shown), or each chip package may have its own voltage regulator (not explicitly shown).

In yet another embodiment (not illustrated) the microcontroller 6 is embedded in a first chip package on a first PCB, and the transceiver module 2 is implemented in another chip package mounted on another PCB, and the signal "sen" is provided via a cable, e.g. a shielded cable from the first PCB to the second PCB.

FIG. 6 shows another variant of the CAN-node shown in FIG. 4, having two microcontrollers 10, 11. The first microcontroller 10 comprises a state machine 8 adapted for processing data received from the CAN-bus and/or for transmitting data to the CAN-bus. The second is microcontroller 11 comprises a monitoring unit 9 adapted for monitoring correct functioning of the state machine 8 of the first microcontroller. Again, the monitoring may be implemented in several ways depending on the specific functionality of the control node 600. In the example shown in FIG. 6, the state machine 8 or other parts of the first microcontroller 10 provide one or more signals to the monitoring unit 9 of the second controller 11, but in other implementations the monitoring unit 9 may analyse the actual data sent by the state machine 8 of the first microcontroller to the transceiver circuit 2.

Or stated in another way, in this embodiment, the data processing microcontroller 10 is separate from a monitoring microcontroller 11. The monitoring microcontroller 11 will handle the pin TEN if a malfunction in the traffic is detected. Assuming the data processing microcontroller 10 permanently sends unwanted but syntactically correct data to the CAN bus, itself cannot detect such situation. The monitoring microcontroller 11 could recognize this condition and can force the CAN transceiver 2 of this CAN node to recessive state independent from the data processing microcontroller 10.

In the embodiment described above, the box 7 indicates a single chip package comprising the two microcontrollers 10, 11 and the CAN-transceiver module 2. In this case, the signal "sen" would be a signal inside that single chip package.

In another embodiment, also illustrated by FIG. 6, the box 7 indicates a PCB boundary, the first microcontroller 10 is embedded in a first chip package, and the second microcontroller 11 is embedded in a second chip package different from the first chip pcakge, and the CAN-transceiver module 2 is implemented in the first chip package, or in the second chip package, or in a third chip package different from the first and second chip package. These chip packages may be mounted on a single PCB, or on two different PCB's or on three different PCB's.

In one particular embodiment (not explicitly shown), the monitoring microcontroller 11 is not on the same PCB as all the other components 5 and/or 10 and/or 2. Such an embodiment is for instance preferred, if the CAN node is under a higher temperature (e.g. "under the hood") or in harsh media (e.g. in the exhaust gas outlet for monitoring the temperature of the exhaust gasses) in automotive applications. The monitoring microcontroller 11 on the separate PCB is then not exposed to these conditions and has therefore a lower probability to fail or malfunction, so that the observation of the data bus and the correct handling of the pin TEN is ensured.

The invention claimed is:

1. A CAN-node comprising:
a transceiver circuit for communicating data over a CAN bus, the CAN-bus having at least a first and a second bus line, the circuit comprising:
a data input port for receiving a signal to be transmitted over the CAN-bus;
a data output port for providing a signal received from the CAN-bus;
a CAN-bus transceiver unit having a receive data output port for providing data received from the CAN-bus, and a transmit data input port for receiving data to be transmitted to the CAN-bus;
a control input port adapted for receiving a control signal indicative of whether transmission of data from this transceiver circuit to the CAN-bus is allowed or prohibited;
a filter circuit adapted for filtering the control signal received on the control input port and for providing a filtered control signal;
logic circuitry adapted for configuring the CAN-bus transceiver unit in receive mode based on the filtered control signal, asynchronous with respect to communication on the CAN-bus, thereby preventing the circuit from transmitting data to the CAN-bus; and
a controller adapted for generating data, and having an input port connected to the data output port of the transceiver circuit for receiving data from the CAN-bus, and having an output port connected to the data input port of the transceiver circuit for transmitting the generated data to the CAN-bus;

wherein the controller comprises:
a state machine for generating said data to be transmitted via said output port and for processing data received via said input port; and
a monitoring unit for monitoring the data transmitted by the state machine, and for providing a control signal for selectively allowing or preventing the generated data to be transmitted to the CAN-bus.

2. A CAN-node according to claim 1, wherein the controller further comprises:
an enable port connected to the control input port of the transceiver circuit for selectively allowing or prohibiting transmission of data to the CAN-bus.

3. A CAN-node according to claim 1, further comprising:
a second controller having an enable port connected to the control input port of the transceiver circuit, the second controller being adapted for monitoring the data transmitted by the first controller, and for providing a control signal for selectively allowing or preventing the generated data to be transmitted to the CAN-bus.

4. A CAN-bus system comprising:
a CAN-bus having at least a first and a second bus line;
at least one CAN-node according to claim 1,
wherein the at least one CAN node comprises a first CAN-node, the first CAN-node being connected to the CAN-bus, and comprising said controller for generating data, and comprising the transceiver circuit with the control input port;
and wherein the CAN-bus system further comprises a monitoring unit for monitoring the data transmitted by the first CAN node, and having an output port connected to the control input port of the first CAN-node, and adapted for monitoring the data and/or analysing the traffic transmitted by the first CAN-node, and adapted providing a control signal for selectively allowing or preventing the data generated by the controller of the first CAN-node to be transmitted to the CAN-bus.

5. The CAN-node according to claim 1, wherein the filter circuit is a debouncing circuit.

6. The CAN-node according to claim 1, wherein the logic circuitry is adapted for configuring the CAN-bus transceiver unit in receive mode solely based on the filtered control signal and/or on a signal present on the data input port.

7. The CAN-node according to claim 1, wherein the output of the logic circuitry is directly connected to the transmit data input port of the CAN-bus transceiver unit.

8. The CAN-node according to claim 1, wherein the logic circuitry does not contain an isolated switch.

9. The CAN-node according to claim 1, wherein the logic circuitry consists only of combinatorial gates.

10. The CAN-node according to claim 1, wherein the logic circuitry is adapted for operating asynchronously in respect to traffic over the CAN network.

11. A CAN-bus system comprising:
a CAN-bus having at least a first and a second bus line;
at least one CAN-node comprising:
a transceiver circuit for communicating data over the CAN bus, the circuit comprising:
a data input port for receiving a signal to be transmitted over the CAN-bus;
a data output port for providing a signal received from the CAN-bus;
a CAN-bus transceiver unit having a receive data output port for providing data received from the CAN-bus, and a transmit data input port for receiving data to be transmitted to the CAN-bus;

a control input port adapted for receiving a control signal indicative of whether transmission of data from this transceiver circuit to the CAN-bus is allowed or prohibited;

a filter circuit adapted for filtering the control signal received on the control input port and for providing a filtered control signal;

logic circuitry adapted for configuring the CAN-bus transceiver unit in receive mode based on the filtered control signal, asynchronous with respect to communication on the CAN-bus, thereby preventing the circuit from transmitting data to the CAN-bus; and a controller adapted for generating data, and having an input port connected to the data output port of the transceiver circuit for receiving data from the CAN-bus, and having an output port connected to the data input port of the transceiver circuit for transmitting the generated data to the CAN-bus;

wherein the at least one CAN node comprises a first CAN-node, the first CAN-node being connected to the CAN-bus, and comprising said controller for generating data, and comprising the transceiver circuit with the control input port;

and wherein the CAN-bus system further comprises a monitoring unit for monitoring the data transmitted by the first CAN node, and having an output port connected to the control input port of the first CAN-node, and adapted for monitoring the data and/or analysing the traffic transmitted by the first CAN-node, and adapted providing a control signal for selectively allowing or preventing the data generated by the controller of the first CAN-node to be transmitted to the CAN-bus.

* * * * *